United States Patent [19]

Thinschmidt et al.

[11] Patent Number: 4,864,650
[45] Date of Patent: Sep. 5, 1989

[54] EXPANSION NETWORK FOR INCREASING THE NUMBER OF SUBSCRIBER TERMINATIONS AT A PASSIVE OPTICAL BUS SYSTEM COMPRISING OPTICAL MIXERS

[75] Inventors: Hans Thinschmidt, Germering, Fed. Rep. of Germany; Rudolf Mittelmann, Linz/Donau, Austria

[73] Assignee: Siemens Aktiengesellschaft, Berlin and Munich, Fed. Rep. of Germany

[21] Appl. No.: 905,488

[22] Filed: Sep. 10, 1986

[30] Foreign Application Priority Data

Sep. 25, 1985 [DE] Fed. Rep. of Germany ....... 3534180

[51] Int. Cl.⁴ .............................................. H04B 9/00
[52] U.S. Cl. ........................................ 455/612; 370/1; 455/600
[58] Field of Search ............... 455/606, 612, 607, 600; 350/96.16; 370/58, 60, 4, 3, 85, 94

[56] References Cited

U.S. PATENT DOCUMENTS 4,543,666  9/1985  Witte et al. ......................... 455/607
4,630,259 12/1986  Larson et al. ........................ 370/60

Primary Examiner—Robert L. Griffin
Assistant Examiner—Leslie Van Beek
Attorney, Agent, or Firm—Hill, Van Santen, Steadman & Simpson

[57] ABSTRACT

An expansion network for increasing the number of subscriber terminations at a passive optical bus system comprising optical mixers is disclosed. The mixers are arranged in groups and the optical transmitters individually provided per subscriber are connected to the light receivers likewise individually provided per subscriber, being connected thereto in the manner of a mesh network via respectively only one of the mixers so that the attenuation of only one mixer is inserted into the optical path.

1 Claim, 1 Drawing Sheet

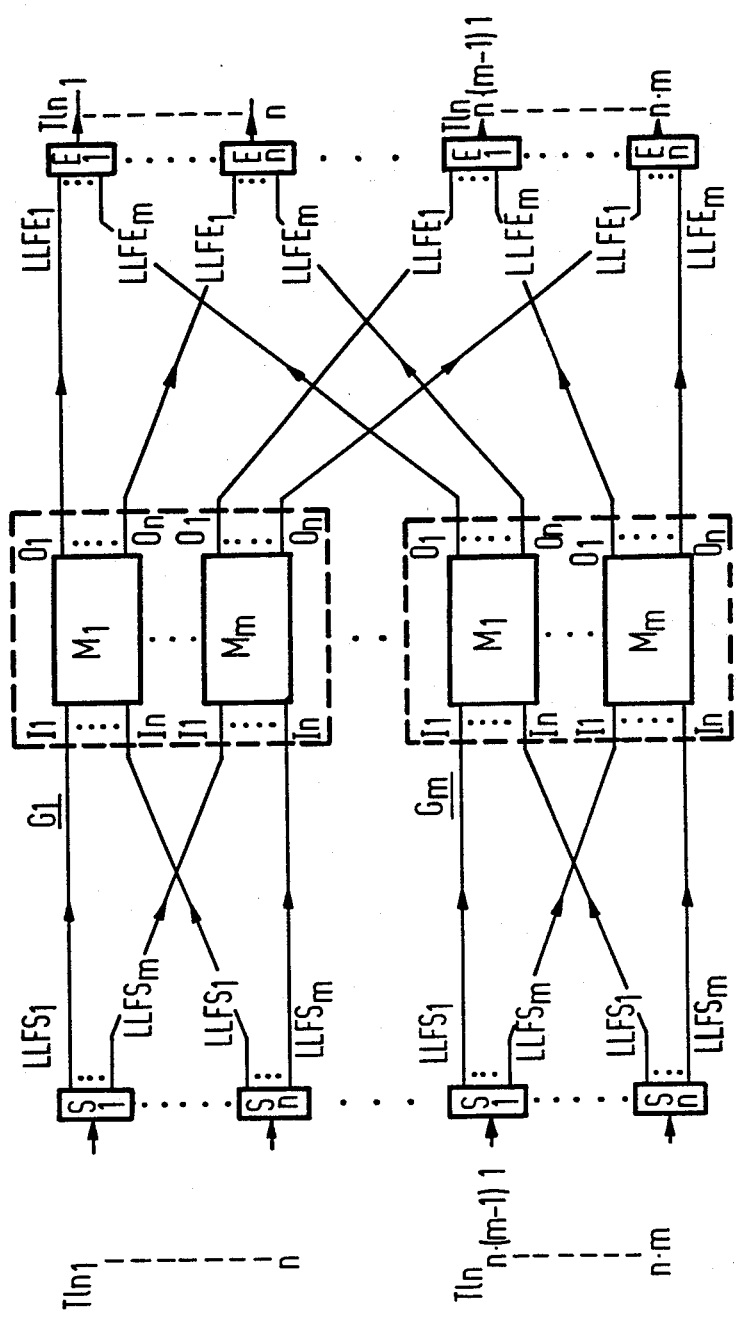

EXPANSION NETWORK FOR INCREASING THE NUMBER OF SUBSCRIBER TERMINATIONS AT A PASSIVE OPTICAL BUS SYSTEM COMPRISING OPTICAL MIXERS

BACKGROUND OF THE INVENTION

1. Field of the Invention

The present invention relates to an expansion network for increasing the number of subscriber terminations at a passive optical bus system comprising optical mixers, for example, what referred to as star couplers.

2. Description of the Prior Art

Passive optical mixers, so-called star couplers, which are useable for the formation of an optical bus system have limited number of inputs and outputs. When one wishes to connect more subscribers, for example, subtask computers in a multicomputer system, to the bus system, then a plurality of star couplers must be interconnected in a suitable manner to form a system.

One possibility for expanding coupler networks to be formed in such a manner is known from the German published application No. 31 23 445, fully incorporated herein by this reference This known expansion possibility has the advantage that opto-electrical amplifiers can be inserted into he appertaining, required light conductors between the star couplers with little expense, the opto-electric amplifiers regenerating the light signals and reducing the attenuation in the coupler network. With respect to transit times and subscriber connection, the meshed star couplers essentially behave in the manner that a correspondingly large coupler would behave when they are joined in close spatial proximity. For ideal optical components, the transmission loss is likewise the same as given a single coupler but, in practice, a few decibels of additional losses are added due to losses in the mixer and, under given conditions, in the required, optical plugs. The signal transit times and attenuations occurring, however, can be disadvantageous, particularly in multicomputer systems.

SUMMARY OF THE INVENTION

The object of the present invention is to provide an expansion network, which likewise permits the possibility of connecting a great number of subscribers, but which is more favorable then the known expansion solution in view of signal transit times and attenuations.

The above object is achieved, according to the present invention by an expansion network for increasing the number of subscriber terminations at a passive optical bus system comprising optical mixers, the expansion network being particularly characterized in that, for the connection of n·m subscribers, for example, sub-task computers in a multicomputer system, which are combined in m groups of n subscribers each, to the optical bus system, m·m mixers in the m groups of m mixers are each provided. Furthermore, m transmitter-side optical fibers optically operated in parallel extend from a light transmitter respectively individually arranged per subscriber, whereby, in each of the m groups the first optical fiber of these m transmitter-side optical fibers which departs from the first light transmitter of the appertaining group is respectively connected to a first optical input of the first mixer of this group, the second optical fiber is connected to a first optical input of the second mixer of the group and the $m^{th}$ transmitter-side optical fiber of the m transmitter-optical fibers is connected to the first optical input of the $m^{th}$ mixer of this group. In addition, m receiver-side optical fibers extend to a light receiver respectively individually arranged per subscriber, whereby, dependent on the appertaining group, for example, on the first group, the first receiver-side optical fiber of the m optical fibers which extends to the first light receiver of the appertaining group departs from a first optical output of the first mixer of this group, the second receiver-side optical fiber departs from a first optical output of the first mixer of the second group, and on down the line until the $m^{th}$ optical fiber departs from the first optical output of the first mixer of the $m^{th}$ group.

BRIEF DESCRIPTION OF THE DRAWING

Other objects, features and advantages of the invention, its organization, construction and operation will be best understood from the following detailed description, taken in conjunction with the accompanying drawing, on which there is a single figure which is a block diagram illustration of a preferred exemplary embodiment of the invention.

DESCRIPTION OF THE PREFERRED EMBODIMENT

The drawing schematically illustrates an arrangement of subscriber-associated light transmitters S for a plurality
of subscribers $T1n_1 \ldots T1n_n$ and $T1n_n (m-1) 1 \ldots t1n_{n \cdot m}$, subscriber-associated light receivers E for the subscribers T1n, optical mixers $M_1 \ldots M_m$, as well as transmitting-side optical fibers LLFS and receiving-side optical fibers LLFE.

For the connection of n·m subscribers T1n, for example, sub-job computers in a multicomputer system, to the optical bus system, the subscribers being combined in m groups $G_1 \ldots G_m$ of n subscribers T1n each, m·m mixers are provided in the m groups $G_1 \ldots G_m$ of m mixers $M_1 \ldots M_m$ each. A plurality m transmitting-side optical fibers $LLFS_1 \ldots LLFS_m$, $LLFS_1 \ldots LLFS_m \ldots$ optically operated in parallel extend from the light transmitters $S_1 \ldots S_n, S_1 \ldots S_n, \ldots$ respectively individually arranged per subscriber T1n, whereby, in each of the m groups $G_1 \ldots G_m$, the first optical fibers LLFS1 of the m transmitting-side optical fibers $LLFS_1 \ldots LLFS_m$ which departs from the first light transmitter $S_1$ of the appertaining group, for example, group $G_1$, is respectively connected to a first optical input I1 of the first mixer $M_1$ of this group $G_1$, the second optical fibers of the m transmitting-side optical fibers are connected to a first optical input of the second mixer of the group, $\ldots$ and the $m^{th}$ transmitting-side optical fibers $LLFS_m$ of the m transmitting-side optical fibers are connected to the first optical input I1 of the $m^{th}$ mixer Mm of the group $G_1$.

A plurality m receiver-side optical fibers $LLFE_1 \ldots LLFE_m, LLFE_1 \ldots LLFE_m, \ldots$, lead to the light receivers $E_1 \ldots E_n, E_1 \ldots E_n, \ldots$ respectively individually arranged per subscriber whereby, dependent on the appertaining group $G_1 \ldots G_m$ for example, dependent on the first group G1, the first receiver-side optical fibers $LLFE_1$ of the m optical fibers $LLFE_1 \ldots LLFE_m$ which lead to the first light receiver $E_1$ of the appertaining group, for example the group $G_1$, extend from a first optical output $O_1$ of the first mixer $M_1$ of the group $G_1$, the second receiver-side optical fibers extend from a first optical output of the first mixer $M_1$ of the second group, $\ldots$ and the $m^{th}$ receiver-side optical fibers LLFE$_m$ of the m optical fibers extend from the first optical output O$_1$ of the first mixer M$_1$ of the m$^{th}$ group.

For example, in accordance with the feature of the invention, respectively m light-emitting diodes LED electrically connected in parallel are arranged in each of the n·m light transmitters S for optical parallel operation of the m transmitting-side optical fibers LLFS.

It can also be provided in accordance with the invention that respectively m light-emitting diodes LED electrically connected in series are arranged in each of the n·m light transmitters S for the optical parallel operation of the m transmitting side optical fibers LLFS.

Another feature of the invention provides that respectively m light-emitting diodes LED are arranged in each of the n·m light transmitters S for optical parallel operation of the m transmitting side optical fibers LLFS, these light-emitting diodes LED being divided into a number of groups, whereby the light-emitting diodes LED of respectively each group are connected electrically parallel to one another and the group arrangements formed in this manner are electrically connected in series.

A solution which is technically more simple, but more involved in terms of cost and space, provides that a respective m-fold arrangement of complete electro-optical transmission transducers is established in each of the n·m light transmitters S for the optical parallel operation of the transmitting-side optical fibers LLFS.

For the optical parallel operation of the transmitter-side optical fibers LLFS, it can also be provided in accordance with the invention that the m optical fibers LLFS$_1$ . . . LLFS$_m$ in each of the n·m light transmitters S are optically coupled to a common light-emitting diode LED in a known manner by what are referred to as tapers, cf. Johnson et al, Appl. Phys. Lett., Vol. 35, No. 1, 1979, Page 479.

Finally, another feature of the invention is characterized in that, for optical parallel operation of the transmitting-side optical fibers LLFS, respectively one optical mixer is provided per subscriber Tln, optical signals from a common, subscriber-associated electro-optical transmission transducer being supplied thereto, these optical signals being transmitted through the optical mixer to the m transmitting-side optical fibers LLFS$_1$ . . . LLFS$_m$ For the reception of optical signals via or more of the m receiving-side optical fibers LLFE$_1$ . . . LLFE$_m$ per subscriber Tln by means of the appertaining light receiver E, respectively m photo-transistors connected electrically parallel can be arranged in each of the n·m light receivers in accordance with the invention.

In accordance with another feature of the invention, a respective m-fold arrangement of complete opto-electrical receiving transducers can be provided in each of the n·m light receivers E for the reception of optical signals via one or more of the m receiver-side optical fibers LLFE.

Alternatively thereto, it can also be provided for the reception of optical signals via one or more of the m receiver-side optical fibers LLFE that the m optical fibers LLFE$_1$ . . . LLFE$_m$ in each of the n·m light receivers E are optically coupled to a common photo-transistor in a known manner by what are referred to as tapers.

Finally, it can also be provided in accordance with the invention that, for the reception of optical signals via one or more of the m receiver-side optical fibers LLFE$_1$ . . . LLFE$_m$, respectively one optical mixer is provided per subscriber Tln, this optical mixer being supplied with optical signals via one or more of the m receiver-side optical fibers LLFE, these optical signals being transmitted by the optical mixer to a common, subscriber-associated opto-electric reception transducer.

In the arrangement shown on the drawing, all star couplers are connected in parallel, i.e. each light pulse traverses only one mixer if one leaves subscriber-associated mixers for light transmitters or, respectively, light transducers which may potentially be provided out of consideration.

The attenuation between a light transmitter and the light receiver is therefore established only by the division factor and losses of a single star coupler (plus line attenuation, plug attenuation, etc, as usual). This advantage of the arrangement particularly comes to bear for purely passive networks having great numbers of subscribers and relatively short distances of the subscribers from the couplers. The number of connections to the light transmitters and light receivers is dependent on the expansion level of the network.

NUMERICAL EXAMPLE 1

In this example 64 subscribers are to be connected to the optical bus system. For this purpose, 16 star couplers and $8 \times 64 = 512$ optical fibers are required. Every transmission module must have four outputs and every receiving module must have four inputs.

The transmission loss of the coupler network (without optical cable) is composed of 12 dB for light division (1:16) plus the simple mixer losses (1 . . . 4 dB).

NUMERICAL EXAMPLE 2

In this example, 1024 subscribers are to be connected to the optical bus system. For this purpose, 16 subscriber groups having 64 subscribers per subscriber group are required. Also, 256 star couplers and $2 \times 16 \times 1024 = 2 \times 16384$ optical fibers are required for this purpose.

The transmission loss of the coupling network is defined by the division factor 1:64 (18.1 dB) plus the simple attenuation loss of the couplers (about 1 . . . 4 dB).

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An expansion network for increasing the number of subscriber terminations at a passive optical bus system having optical mixers, comprising:

a plurality of light transmitters, each light transmitter having an input and m outputs, the plurality of light transmitters being grouped into m groups, each of the m groups of light transmitters containing light transmitters, S1 . . . Sn;

a plurality of mixers, each of the mixers having n inputs, I1 . . . In, and n outputs, O1 . . . On, the plurality of mixers being grouped into m groups, each of the m groups of mixers containing m mixers, M1 . . . Mn;

a plurality of transmitter-side optical fibers, each output of the light transmitters having one of the plurality of transmitter-side optical fibers connected thereto in a one-to-one correspondence, for each of the m groups of light transmitters the transmitter-side optical fibers thereby being grouped into n groups of m transmitter-side optical fibers, LLFS1 . . . LLFSm, corresponding to the m outputs of each of the n light transmitters, the Xth output of the Yth light transmitter in the Zth group of m groups of light transmitters being connected by one of the plurality of transmitter-side optical fibers to th Yth input of the Xth mixer in the Zth group of m mixers, where $X = 1 \ldots m$, for
$y = 1 \ldots n$, for
$Z = 1 \ldots m$;

a plurality of light receivers, each light receiver having an output and m inputs, the plurality of light receivers being grouped into m groups, each of the m groups of light receivers containing n light receivers, E1 . . . En;

a plurality of receiver-side optical fibers, each input of the light receivers having one of the plurality of receiver-side optical fibers connected thereto in a one-to-one correspondence, from each of the m groups of light receivers the receiver-side optical fibers thereby being grouped into n groups of m receiver-side optical fibers, LLFE1 . . . LLFEm, corresponding to the m inputs of each of the n light receivers, the Yth output of the Xth mixer in the Zth group of m mixers being connected by one of the plurality of receiver-side optical fibers to the Zth input of the light receiver of the Xth group of m groups of light receivers, where $X = 1 \ldots m$, for
$Y = 1 \ldots n$, for
$Z = 1 \ldots m$.

* * * * *